United States Patent [19]
Greene

[11] Patent Number: 4,583,511
[45] Date of Patent: Apr. 22, 1986

[54] CARBURETION APPARATUS

[76] Inventor: Harry E. Greene, Rte. 1, Box 217, Cataula, Ga. 31804

[21] Appl. No.: 198,855

[22] Filed: Oct. 20, 1980

[51] Int. Cl.⁴ .......................................... F02M 31/00
[52] U.S. Cl. .................................. 123/545; 123/546; 165/52; 261/144
[58] Field of Search ....................... 123/545, 546, 552; 261/144, 145; 165/52

[56] References Cited

U.S. PATENT DOCUMENTS

| | | | |
|---|---|---|---|
| 1,133,845 | 3/1915 | Farnsworth | 123/546 |
| 1,290,120 | 1/1919 | Doll | 165/52 |
| 1,322,654 | 11/1919 | Thomas | 261/145 |
| 1,658,538 | 2/1928 | Scott | 261/144 |
| 3,762,385 | 10/1973 | Hollnagel | 261/144 |
| 4,016,847 | 4/1977 | Rychlik | 123/546 |
| 4,079,715 | 3/1978 | Masaki | 123/557 |

FOREIGN PATENT DOCUMENTS 102574  3/1937  Australia ............................ 261/145

Primary Examiner—Ronald H. Lazarus
Attorney, Agent, or Firm—James B. Middleton

[57] ABSTRACT

The invention comprises a carburetion apparatus for use with an internal combustion engine having a generally conventional carburetor, an intake manifold and an exhaust manifold. The carburetion apparatus has a central chamber that receives the fuel-air mixture from the carburetor and delivers the fuel-air mixture to the intake manifold. The central chamber is provided with baffles to divert the fluid flow and cause intimate mixing of fuel and air. The baffles are such that the manifold vacuum is raised (or, the pressure is lowered), so the vacuum assists in evaporating liquid fuel. The baffles may be heated by passing exhaust gases through them, the exit of the exhaust gas being slowed by a constricted outlet.

4 Claims, 4 Drawing Figures

U.S. Patent  Apr. 22, 1986  4,583,511
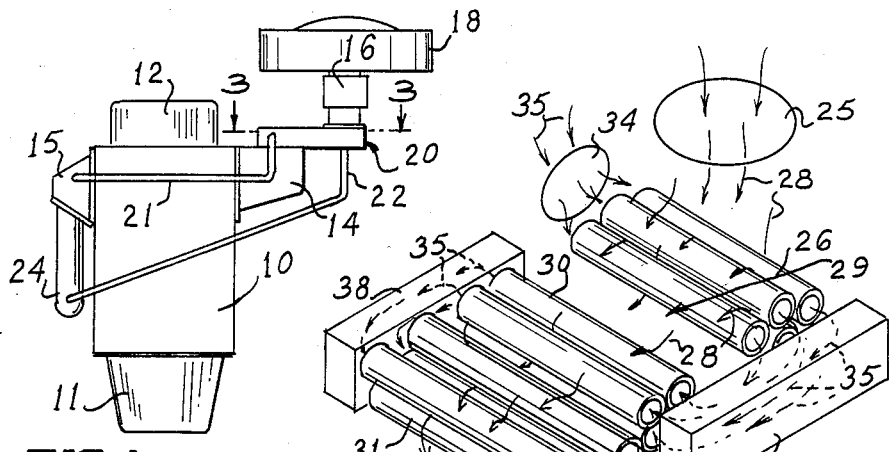
FIG. 1
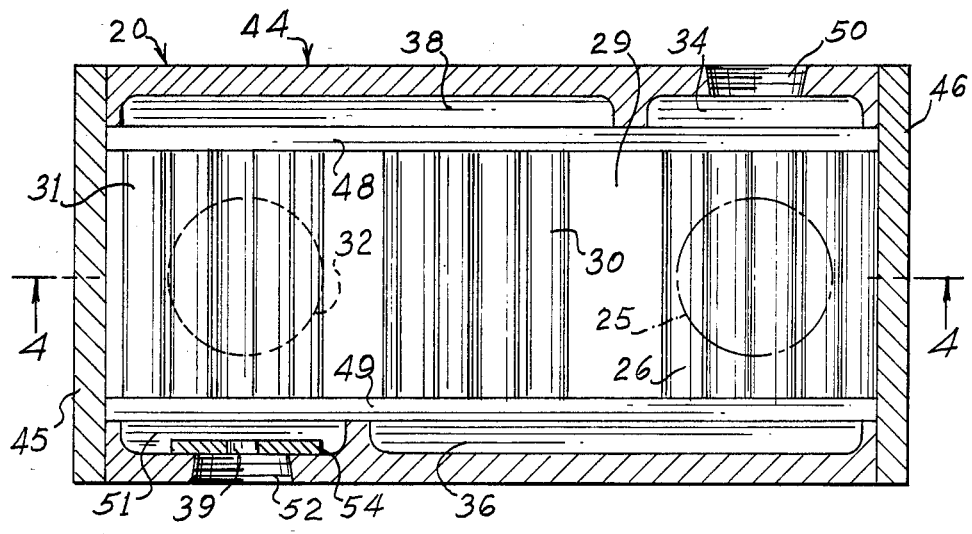
FIG. 2
FIG. 3
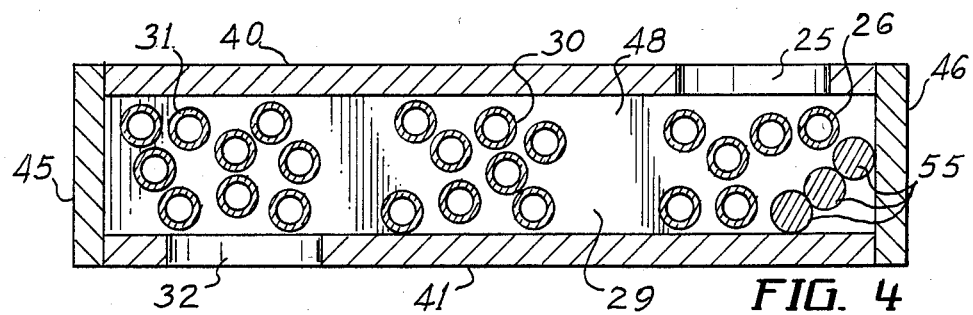
FIG. 4

CARBURETION APPARATUS

FIELD OF THE INVENTION

This invention relates generally to carburetion apparatus for internal combustion engines, and is more particularly concerned with a device for use in conjunction with a generally conventional carburetor means for improving the vaporization of fuel and mixing of fuel with the air.

BACKGROUND OF THE INVENTION

It is well known that, in an internal combustion engine, it is necessary to mix air with the fuel and to place the mixture into a cylinder for combustion. There are numerous forms of carburetor in which liquid fuel is sprayed into a draft of air to achieve the desired mixing. It is also known to utilize the heat from the exhaust manifold to heat the incoming fuel in an effort to make the fuel vaporize more readily. While the simple heating of the fuel line may improve vaporization somewhat, such a technique has never been totally successful in achieving the desired degree of vaporization of the fuel before the fuel is placed into the engine.

In the past, there have been a number of devices utilizing a plurality of baffles to break up the droplets of fuel by mechanical means; and, such apparatus has also sometimes utilized heated baffles so that the heat will assist in breaking down and/or vaporizing the fuel. In the modern gasoline engines, it will be understood that very little increase in efficiency can be obtained simply by a mechanical breaking up of liquid droplets. Additional turbulence and the like similarly achieve very little increase in efficiency. The prior art devices wherein the fuel-air mixture is passed through and among heated baffles or the like have been designed for use with extremely heavy fuels, and such devices have not been made operable on a modern engine. Since an internal combustion engine is essentially a heat engine, the engine is operating on the difference of temperature. As a result, if the incoming air is heated, the efficiency of the engine is tremendously reduced. These prior art devices have been so designed that the incoming air would be substantially heated, but the heat was tolerable because the fuel was otherwise unusable. Thus, the prior art does not disclose any means for improving the vaporization and intimate mixing of fuel and air as received from a substantially conventional carburetor means to achieve improved fuel economy.

SUMMARY OF THE INVENTION

The present invention overcomes the above mentioned and other difficulties with the prior art apparatus by providing an apparatus for improved carburetion wherein a series of baffles is inserted between the intake manifold and the carburetor means, the baffles being sufficient to raise the manifold vacuum. This increased manifold vacuum, in conjunction with the series of baffles, improves fuel vaporization and improves intermixing of vaporized fuel and air. The baffles may also be heated to improve fuel vaporization, the heating being so slight that the heat goes into vaporization of liquid fuel and there is no noticeable effect on the incoming air temperature. The apparatus made in accordance with the present invention includes an enclosed chamber having a plurality of tubes thereacross, the plurality of tubes acting as baffles to increase resistance to air flow and to cause agitation to increase fuel and air intermixing. The tubes are divided into a plurality of groups of tubes, and a small portion of the exhaust gases pass successively through the groups of tubes for the desired heating. Since the fuel is well vaporized and intimately mixed with air, considerably less fuel is required. Use of the device of the present invention therefore substantially increases the fuel efficiency of the engine without substantial modification of the engine, and without special fuels or special driving techniques.

BRIEF DESCRIPTION OF THE DRAWINGS

These and other features and advantages of the present invention will become apparent from consideration of the following specification when taken in conjunction with the accompanying drawings in which:

FIG. 1 is a rather schematic front elevational view of a conventional internal combustion engine having the carburetion apparatus of the present invention installed thereon;

FIG. 2 is a schematic illustration showing the flow of the fuel-air mixture through the apparatus of the present invention, and showing the flow of heating gases therethrough;

FIG. 3 is an enlarged cross-sectional view taken substantially along the line 3—3 in FIG. 1; and, FIG. 4 is a cross-sectional view taken substantially along the line 4—4 in FIG. 3.

DESCRIPTION OF AN EMBODIMENT OF THE INVENTION

Referring now more particularly to the drawings, and to that embodiment of the invention here presented by way of illustration, FIG. 1 shows a generally conventional four stroke cycle internal combustion gasoline engine. The engine 10 has the oil pan 11 at the bottom thereof, and the rocker arm cover 12 on top. On one side of the engine 10, there is the intake manifold 14, and on the other side there is the exhaust manifold 15. The conventional carburetor designated at 16 is provided with an air cleaner 18.

At this point, it should be understood that the carburetor 16 would normally be mounted directly on the intake manifold 14 so that, when the carburetor 16 mixes the fuel and air, the mixture would be placed directly into the intake manifold 14. As here shown, however, there is the additional mixing device, or carburetion apparatus of the present invention mounted between the carburetor 16 and the intake manifold 14. It will therefore be seen that the fuel-air mixture from the carburetor 16 passes through the apparatus 20, and from the apparatus 20 into the intake manifold 14 for subsequent use in the cylinders of the engine 10.

For providing the heat to be used in the device 20, there is a pipe 21 which is connected to the exhaust manifold 15 for diverting a small portion of the exhaust gases through the pipe 21 and into the device 20. After the exhaust gases have passed through the device 20, the gases are conveyed through a pipe 22 and connected at 24 back to the exhaust system of the engine 10.

It will be understood that the pressure in the exhaust manifold 15 is relatively high since the exhaust gases are pumped directly into the exhaust manifold 15. Thus, this gas under pressure can be used to assure a sufficient flow of hot gases through the pipe 21 and to the mixing device 20. When the exhaust gases are to be placed back into the exhaust system, the gases are conveyed through the pipe 22 and connected further down the line in the exhaust system, such as in the pipe or pipes carrying the exhaust gases from the exhaust manifold.

Attention is next directed to FIG. 2 of the drawings for an understanding of the operation of the device of the present invention. In FIG. 2, it should be understood that the holes and cavities are represented to illustrate the flow of fluids through the device, and most of the hardware is omitted. With this in mind, it will be seen that the fuel-air mixture from the carburetor 16 will pass through the entrance hole 25 and will immediately engage a baffle 26. The baffle 26 is made up of tubular members so that the fuel-air mixture, represented by the arrows 28, can pass over and around the tubular members while hot gases can pass through the central hole in the members for heating the baffle 26.

Continuing to look first at the flow of the fuel-air mixture represented by the arrows 28, it will be seen that the fuel-air mixture passes through the baffles 26, then continues to move through the central chamber 29 to engage a second baffle 30. Again, the fuel-air mixture 28 will flow over and around the tubular members of the baffle 30, and will continue to flow through the chamber 29 until it engages a third baffle 31. The baffle 31 is adjacent to the exit hole 32 so that, as the fuel-air mixture 28 passes through the baffle 31, the fuel-air mixture will flow through the hole 32 and into the intake manifold 14.

The baffle 26, being constructed of tubular members as previously mentioned, is arranged so the central opening of the tubular members are connected to a hole 34, and hot exhaust gases represented by the arrows 35 are directed through the hole 34 to pass through the tubular members of the baffle 26. This hot gas will of course cause some heating of the baffle 26 as the gas passes therethrough. As the gases 35 leave the baffle 26, the gases 35 are directed through a connecting passage 36 to the baffle 30. From the connecting passage 36, the gases 35 pass through the baffle 30, thence to a second connecting passage 38. The gases 35 pass through the connecting passage 38 and into the final baffle 31, then pass through the baffle 31 to the exit port 39.

It will be noted that the exit port 39 is quite small. It has been found that, if the exhaust gases are allowed to flow freely through the baffles, there will be excess heating of the baffles so that the incoming air will be significantly heated. On the other hand, if the entrance hole 34 is made as a restriction, the tubular baffle members will not be filled with the exhaust gases and there will be virtually no heating of the various baffles. However, by using the restrictive exit port 39, it will be understood that the relatively high pressure from the exhaust manifold 15 will cause gases to pass through the hole 34 and into the tubular baffle so that there will be some heating of the baffles 26, 30 and 31; however, the rstrictive exit port 39 reduces the flow of exhaust gases therethrough to prevent undue heating. It will of course be recognized by those skilled in the art that valves and the like can be substituted for the restrictive port 39 to achieve the same results, but the restrictive exit port is an economical means to achieve the desired result, and is sufficiently simple that it will not cause problems during use.

With the foregoing general discussion in mind, attention is directed primarily to FIGS. 3 and 4 of the drawings which show the construction of a device made in accordance with the present invention. In FIGS. 3 and 4 it will be seen that the device includes a top plate 40 and a bottom plate 41, the top plate 40 having a hole 25 therein for receiving the fuel-air mixture from the carburetor 16. The bottom plate 41 is parallel to the top plate 40, and defines the hole 32 for delivering the fuel-air mixture into the intake manifold 14. The central chamber 29 is defined by the top and bottom plates 40 and 41, and by a pair of front and rear walls 42 and 44. The outside of the device is completed by two end walls 45 and 46. Thus, the carburetion apparatus 20 has a generally rectangular body with parallel top and bottom members 40 and 41 closed by the four walls 42, 44, 45 and 46.

Within the central chamber 29, there is a pair of baffle supporting walls 48 and 49, the wall 48 being contiguous with the rear member 44 while the wall 49 is contiguous with the front member 42. Between the wall members 48 and 49, there are extended the plurality of tubes making up the baffles 26, 30 and 31. These will be discussed in more detail hereinafter.

As best shown in FIG. 3 of the drawings, there is a threaded hole 50 for receipt of the pipe 21 which leads from the exhaust manifold 15. While it should be obvious that numerous forms of connection may be used, it is contemplated that a simple pipe thread 50 can be used for easy connection.

The threaded hole 50 communicates with the hole 34 in the rear member 44, the hole being the entrance hole for the hot exhaust gases. It will be understood that the hole 34 is of such size as to encompass all of the tubular members comprising the baffle 26 so that exhaust gas can pass through all of the tubes comprising the baffle 26.

In the front wall 42 of the device 20, the connecting passage 36 also encompasses all of the tubes comprising the baffle 26, as well as all of the tubes comprising the baffle 30. As a result, the exhaust gases can flow from the baffle 26 through the connecting passage 36 and into the baffle 30. The connecting passage 38 is similar and is formed in the rear member 44 to connect the tubes comprising baffle 30 to the tubes comprising the baffle 31. The gases then flow through the tubes comprising the baffle 31 and into an opening 51 in the front wall 42.

It will be remembered that the exit for the exhaust gases was a constricted aperture. While this constriction may be formed in numerous ways, as here shown there is a threaded hole 52 for receiving the pipe 22, the pipe thread or the like again being a simple expedient for connecting a pipe to the device. Within the opening 51, there is a washer-like member 54 which substantially closes the hole 52, and the member 54 includes the aperture 39. While not here illustrated, it will be understood by those skilled in the art that the member 54 can be tack welded into place, or can have a plurality of screws or the like for easy installation and removal. It should be kept in mind that the opening 51 is required so that gas can flow through all the tubes making up the baffle 31.

Attention is next directed primarily to FIG. 4 of the drawings for a further description of the baffles. In FIG. 4 it will be seen that the number of tubes making up each successive baffle increases from the entrance to the exit 32. Since the exhaust gases enter the device through the hole 50 adjacent to the baffle 26, it will be understood that the gas is at its highest temperature for the baffle 26. The temperature is then somewhat lower for the baffle 30, and lower yet for the baffle 31. Largely because of this, the surface area is increased by increasing the number of tubes making up the baffles in an effort to achieve substantially the same amount of vaporization of fuel throughout the chamber 29.

Those skilled in the art will realize that fluid flow around a cylindrical member is such that the fluid engages one side of the cylinder and flows around the cylinder so there is complete contact of the cylinder wall with the fluid. Also, it should be realized by those skilled in the art that, if the fuel-air mixture flows through the mixing device 20 in laminar flow, there is obviously no intermixing of the fuel and the air, and there is also little or no effective heating of the fuel. It will be understood that, if the fluid flows through the device 20 in laminar flow, some heat can be added at one layer, but this heat will not be communicated to other layers of the laminar flow fluid.

Because of the foregoing facts, the tubes making up the baffles 26, 30 and 31 are so placed that there is no straight line entirely through the mixing device 20 from the entrance 25 to the exit 32. The various tubes are placed in a staggered relationship so that fluid will engage one side of the tube, flow therearound and continue through the device. This arrangement requires that all of the fluid will engage one or more of the tubes making up the baffles, and there will be sufficient lateral forces exerted on the fluid as it passes through the mixing device that there is considerable intermixing of the fuel and the air. The flow is therefore not laminar, but is also not so turbulent as to prevent sufficient flow through the device.

Generally at the entrance end of the device 20, it will be seen that there are three members designated at 55. While these members 55 are part of the baffle 26, it will be seen that there is no central opening in the members 55 so they will not be heated. The members 55 are therefore present for their role in directing fluid flow only.

From the foregoing description, those skilled in the art should now understand the operation of the device of the present invention. It will be recognized that, in vaporizing fuel for an internal combustion engine, one must take care not to vaporize and thin the fuel too much or there will be an insufficient charge in a cylinder to provide the desired uniform rate of combustion for proper engine operation. The opposite extreme, however, is to provide insufficient vaporization and an excess of fuel with respect to the air so that a relatively large quantity of liquid is placed into a cylinder. Again, one will not obtain the desired uniform rate of combustion.

Thus, in utilizing the device of the present invention, it will be understood that the baffles 26, 30 and 31 are such that the fluid flow into the intake manifold is restricted, resulting in an increased vacuum in the manifold, which is to say a lower pressure in the intake manifold 14. Though particular engines and operations will vary, the manifold vacuum will be increased by about 5 inches. As a natural result, there will be a higher pressure in the throat of the carburetor 16. Since the pressure in the carburetor throat 16 will be raised, it will be understood that the carburetor itself will have to be adjusted to provide the proper amount of fuel, operating at the higher pressure. In any event, given sufficient fuel entering the mixing device 20 through the carburetor 16, the fuel will enter the opening 25 and engage the plurality of tubes comprising the baffle 26. The fuel-air mixture will be diverted with the assistance of the members 55 as well as the tubes so that the fuel-air mixture will continue to pass through the central opening 29 and engage the baffle 30. The fuel-air mixture will continue, engaging the baffle 31 and passing through the hole 32 and into the intake manifold 14. Due to both the diverting action of the baffles and the increased vacuum, the passage through the mixing device 20 will substantially vaporize the liquid fuel and will cause intimate mixing between the air and the fuel. As a result, it will be understood by those skilled in the art that the fuel efficiency will be higher since the carburetion is improved.

Also, with the carburetion apparatus of the present invention, the fuel is substantially completely burned in the cylinders of the engine, so there is no burning in the exhaust system. Such burning in the exhaust system, which is common in the prior art, can create an undesirably high pressure to lower the efficiency of the engine. As a result, this also increases the fuel efficiency.

Though the apparatus of the present invention provides the minimum fuel for operation of the engine, it should also be understood that, when the engine is turned off, there will be some fuel remaining in the carburetion device 20; and, as the engine cools, this fuel will condense. Thus, when a cold engine is to be started, there is a sufficient quantity of fuel available for a quick start.

Rather than the arrangement as here presented, it will be obvious to those skilled in the art that a fuel injection system could be utilized wherein fuel would be injected into the area of the carburetor 16, and the fuel mixing device 20 could be utilized; or, various other forms of carburetor means may be utilized in conjunction with the carburetion apparatus of the present invention.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as defined in the appended claims.

I claim:

1. A carburetion apparatus, for a combustion engine including carburetor means for creating a fuel-air mixture, and an intake manifold for receiving said fuel-air mixture, said carburetion apparatus comprising a body having a central passage therethrough, a plurality of baffles across said central passage, one end of said body receiving said carburetor means and defining an entrance for passage of said fuel-air mixture from said carburetor means to said central passage, the opposite end of said body being fixed to said intake manifold and defining an exit therein for passage of said fuel-air mixture from said central passage into said intake manifold, said plurality of baffles being located in said central passage between said entrance and said exit and constituting a sufficient restriction to cause a pressure drop between said carburetor means and said intake manifold, each baffle of said plurality of baffles comprising a plurality of tubular members extending across said central passage such that said fuel-air mixture engages said tubular members as said fuel-air mixture flows through said central passage, and means for heating said plurality of tubular members, said central passage being generally horizontal, said entrance and said exit being horizontally displaced from each other, said engine further including an exhaust manifold for receiving exhaust gases from said engine, and an exhaust pipe for carrying said exhaust gases from said exhaust manifold, a first baffle of said plurality of baffles including a first plurality of tubular members and being adjacent to said entrance, a second baffle of said plurality of baffles including a second plurality of tubular members and being between said entrance and said exit, a third baffle of said plurality of baffles including a third plurality of tubular members and being adjacent to said exit, and first pipe means for conveying some of said exhaust gases from said exhaust manifold to a first end of said first plurality of tubular members, said tubular members in said first, second and third plurality of tubular members being so staggered as to preclude laminar fluid flow from said entrance to said exit, and including front wall means defining a first connecting passage for connecting a second end of said first plurality of tubular members to a first end of said second plurality of tubular members, and a rear wall means defining a second connecting passage for connecting a second end of said second plurality of tubular members to a first end of said third plurality of tubular members, and second pipe means connecting a second end of said third plurality of tubular members to said exhaust pipe, the arrangement being such that said exhaust gases pass successively through said baffles and back to said exhaust pipe.

2. A carburetion apparatus as claimed in claim 1, and further including means for restraining flow of said exhaust gases from said second end of said third plurality of tubular members to said second pipe means.

3. A carburetion apparatus as claimed in claim 2, all of said tubular members being generally parallel to one another and generally perpendicular to the fluid flow from said entrance to said exit.

4. A carburetion apparatus, for a combustion engine including carburetor means for creating a fuel-air mixture, and an intake manifold for receiving said fuel-air mixture, said carburetion apparatus comprising a body having a central passage therethrough, a plurality of baffles across said central passage, one end of said body receiving said carburetor means and defining an entrance for passage of said fuel-air mixture from said carburetor means to said central passage, the opposite end of said body being fixed to said intake manifold and defining an exit therein for passage of said fuel-air mixture from said central passage into said intake manifold, said plurality of baffles being located between said entrance and said exit and being sufficient to cause a pressure drop between said carburetor means and said intake manifold, said central passage being generally horizontal, said entrance and said exit being horizontally displaced from each other, said engine further including an exhaust manifold for receiving exhaust gases from said engine, and an exhaust pipe for carrying said exhaust gases from said exhaust manifold, a first baffle of said plurality of baffles including a first plurality of tubular members and being adjacent to said entrance, a second baffle of said plurality of baffles including a second plurality of tubular members and being between said entrance and said exit, a third baffle of said plurality of baffles including a third plurality of tubular members and being adjacent to said exit, and first pipe means for conveying some of said exhaust gases from said exhaust manifold to a first end of said first plurality of tubular members, said tubular members in said first, second and third pluralities of tubular members being so staggered as to preclude laminar fluid flow from said entrance to said exit, and including front wall means defining a first connecting passage for connecting a second end of said first plurality of tubular members to a first end of said second plurality of tubular members, and rear wall means defining a second connecting passage for connecting a second end of said second plurality of tubular members to a first end of said third plurality of tubular members, and second pipe means connecting a second end of said third plurality of tubular members to said exhaust pipe, the arrangement being such that said exhaust gases pass successively through said baffles and back to said exhaust pipe, and further including means for restraining flow of said exhaust gases from said second end of said third plurality of tubular members to said second pipe means, all of said tubular members being generally parallel to one another and generally perpendicular to the fluid flow from said entrance to said exit, said third plurality of tubular members being greater in number than said second plurality of tubular members, and said second plurality of tubular members being greater in number than said first plurality of tubular members.

* * * * *